US010637783B2

(12) United States Patent
Krishna Singuru (10) Patent No.: US 10,637,783 B2
(45) Date of Patent: Apr. 28, 2020

(54) METHOD AND SYSTEM FOR PROCESSING DATA IN AN INTERNET OF THINGS (IOT) ENVIRONMENT

(71) Applicant: WIPRO LIMITED, Bangalore (IN)

(72) Inventor: Radha Krishna Singuru, Hyderabad (IN)

(73) Assignee: Wipro Limited, Bangalore (IN)

(*) Notice: Subject to any disclaimer, the term of this patent is extended or adjusted under 35 U.S.C. 154(b) by 128 days.

(21) Appl. No.: 15/681,660

(22) Filed: Aug. 21, 2017

(65) Prior Publication Data
US 2019/0014048 A1    Jan. 10, 2019

(30) Foreign Application Priority Data

Jul. 5, 2017   (IN) .............................. 201741023647

(51) Int. Cl.
*H04L 12/851* (2013.01)
*H04L 29/08* (2006.01)
(Continued)

(52) U.S. Cl.
CPC .............. *H04L 47/24* (2013.01); *H04L 12/66* (2013.01); *H04L 41/5041* (2013.01);
(Continued)

(58) Field of Classification Search
CPC ...................................... H04L 67/12
See application file for complete search history.

(56) References Cited

U.S. PATENT DOCUMENTS 10,067,801 B1 *  9/2018  Wagner .............. G06F 9/5055
2015/0016249 A1  1/2015  Mukundan et al.
(Continued)

FOREIGN PATENT DOCUMENTS

WO    WO 2016/159949     10/2016
WO       2017052775 A1   3/2017

OTHER PUBLICATIONS

Nguyen, T.T.T., "A survey of techniques for internet traffic classification using machine learning", *IEEE Communications Survey & Tutorials*, vol. 10; Issue 4, Fourth Quarter 2008, 3 pages.
(Continued)

*Primary Examiner* — Jeffrey M Rutkowski
*Assistant Examiner* — Chae S Lee
(74) *Attorney, Agent, or Firm* — Finnegan, Henderson, Farabow, Garrett & Dunner, LLP (57) ABSTRACT

A method, corresponding system, and computer program product for edge data processing in an Internet of Things (IoT) environment is disclosed. The method includes receiving, by an IoT Gateway device, a data traffic generated by one or more edge devices in the IoT environment. Thereafter, the IoT Gateway device classifies the received data traffic as one of a normal data and a critical data. In response to classifying the received data traffic, the IoT Gateway device thereafter automatically designates a network location for processing the received data traffic. The network location corresponds to an edge computing resource arranged locally to the IoT Gateway device when the received data is classified as critical data and the network location corresponds to a remote cloud computing resource when the received data is classified as normal data.

11 Claims, 7 Drawing Sheets

(51) Int. Cl.
   *H04L 29/06*   (2006.01)
   *H04L 12/66*   (2006.01)
   *H04L 12/24*   (2006.01)

(52) U.S. Cl.
   CPC .......... *H04L 63/10* (2013.01); *H04L 67/1097* (2013.01); *H04L 67/12* (2013.01)

(56) References Cited

U.S. PATENT DOCUMENTS

| | | |
|---|---|---|
| 2017/0060574 A1 | 3/2017 | Malladi et al. |
| 2017/0094018 A1* | 3/2017 | Ekstrom ................. H04L 67/20 |
| 2018/0067779 A1* | 3/2018 | Pillalamarri .......... G06F 9/5072 |
| 2018/0234351 A1* | 8/2018 | Amento .............. H04L 65/1063 |

OTHER PUBLICATIONS

Pahl, C. et al., "Containers and Cluster for Edge Cloud Architectures—a Technology Review", *Future Internet of Things and Cloud (FICloud)* 2015, 3 pages.

Munir, A., et al., "IFCIoT: Integrated Fog Cloud IoT Architectural Paradigm for Future Internet of Things", Jan. 30, 2017, pp. 1-9.

Extended European Search Report issued in the European Patent Office in counterpart European Application No. 17209091.2, dated Jun. 27, 2018, 8 pages.

\* cited by examiner

METHOD AND SYSTEM FOR PROCESSING DATA IN AN INTERNET OF THINGS (IOT) ENVIRONMENT

TECHNICAL FIELD

The present invention relates to an Internet of Things (IoT) environment, in particular, to method and system for processing data in an IoT environment.

BACKGROUND

Recent advances in embedded and software technology as well as the fusion of communication technology with Internet technology has led to the proliferation of Internet of Things (IoT) in all aspects of today's life. In an IoT environment, various kinds of physical and virtual devices are connected with each other to exchange data using one or more communication technologies such as Wi-Fi, Bluetooth, WiMAX, GPRS, GSM, ZigBee, Radio Frequency (RF), and Global Positioning System (GPS). Each device in the IoT environment is uniquely identified and covers a variety of applications, protocols, and domain. Further, the IoT devices may be associated with different data types, different information formats, different devices libraries, different instructions and so forth. The IoT environment may thus allow, for example, the things to be sensed, monitored and/or controlled remotely using the existing communication infrastructure.

Development in technologies such as Big Data and Cloud Computing have further contributed in increasing the adoption of IoT. An IoT gateway acts as a bridge between the devices sitting at the edge in IoT environment and the remote cloud. The IoT gateway transfers the data generated from devices such as sensors, remote devices, valves, controllers, wearables, and mobile devices sitting on the edge of the IoT environment to the remote cloud for further processing and analyzing the data.

All the data collected at the gateway cannot be processed because of the limited resources and computing capabilities at the edge and hence need to be pushed to the cloud. However, a major drawback of pushing the generated data to the remote cloud is that all the data cannot be processed and analyzed in an effective manner in the cloud. Time critical tasks cannot be pushed to the remote cloud as the network suffers from inherent latencies thereby making the processing of such time critical tasks ineffective in the remote cloud. Further, transferring data to the remote cloud also suffers from security issues which makes it difficult to push sensitive data to the remote cloud for processing and analyzing. There are solutions available that allow for processing the data traffic at the edge based on some segmentation rules. However, the segmentation rules are based upon the state of the network, such as processor loads, link bandwidths, storage capacities, fault events, and security threats. This may end up in processing some critical data in the remote cloud when the edge resources are static or when the edge resources go down under high load.

SUMMARY

In one embodiment, a method for edge data processing in an IoT environment is disclosed. The method includes receiving, by an IoT Gateway device, a data traffic generated by at least one edge device in the IoT environment; classifying, by the IoT Gateway device, the received data traffic as one of a normal data and a critical data; and automatically designating, by the IoT Gateway device, a network location for processing the received data traffic in response to classifying, wherein the network location corresponds to an edge computing resource arranged locally to the IoT Gateway device when the received data is classified as critical data and the network location corresponds to a remote cloud computing resource when the received data is classified as normal data.

In another embodiment, a system for edge data processing in an Internet of Things (IoT) environment is disclosed. The system includes a cloud server, at least one edge device, and an IoT Gateway device, wherein the IoT Gateway device is operatively coupled with the at least one edge device and the cloud server. The IoT Gateway device is configured to receive a data traffic generated by at least one edge device in the IoT environment; classify the received data traffic as one of a normal data and a critical data; and automatically designate a network location for processing the received data traffic in response to classifying, wherein the network location corresponds to an edge computing resource arranged locally to the IoT Gateway device when the received data is classified as critical data and the network location corresponds to a remote cloud computing resource when the received data is classified as normal data.

In yet another embodiment, a computer-usable medium is disclosed, the computer-usable medium having non-transitory computer readable instructions stored thereon for execution by a processor in an IoT Gateway device to perform a method for receiving a data traffic generated by at least one edge device in the IoT environment; classifying the received data traffic as one of a normal data and a critical data; and automatically designating a network location for processing the received data traffic in response to classifying, wherein the network location corresponds to an edge computing resource arranged locally to the IoT Gateway device when the received data is classified as critical data and the network location corresponds to a remote cloud computing resource when the received data is classified as normal data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for edge data processing in an IoT environment. The method includes receiving, by an IoT Gateway device, a data traffic generated by at least one edge device in the IoT environment. Thereafter, the received data traffic is classified as one of a normal data and a critical data by the IoT Gateway device. Finally, the IoT Gateway device automatically designates a network location for processing the received data traffic in response to classifying the received data traffic, wherein the network location corresponds to an edge computing resource arranged locally to the IoT Gateway device when the received data is classified as critical data and the network location corresponds to a remote cloud computing resource when the received data is classified as normal data.

Figure 1:
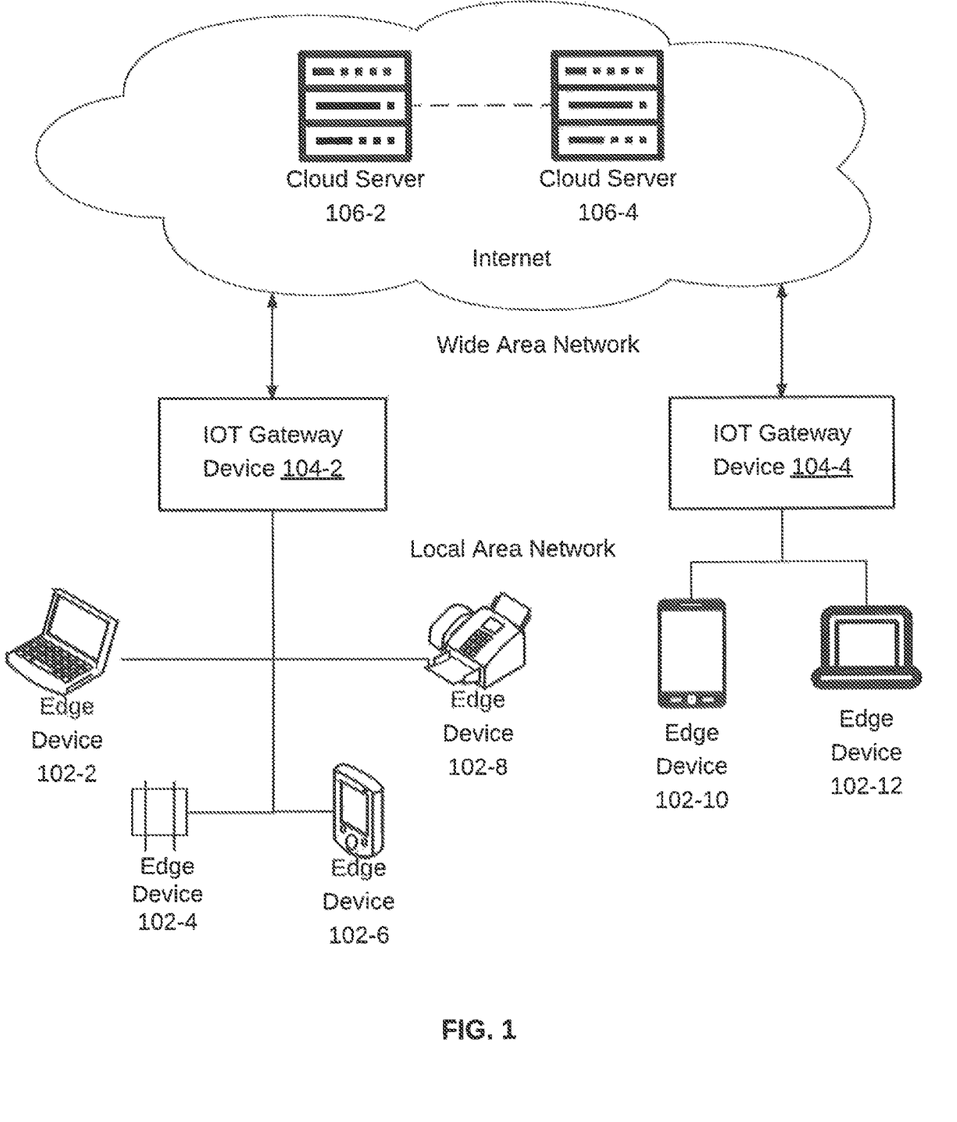
FIG. 1 is a system diagram of an Internet of Things (IoT) environment (that is exemplary) in which embodiments of the present inventive concepts may be employed.

FIG. 1 is a system diagram of an Internet of Things (IoT) environment 100, in which embodiments of the present inventive concepts may be employed. IoT environment 100 includes multiple Edge Devices 102-n operatively connected with one or more IoT Gateway device 104-n. IoT environment 100 may represent various environments such as, but not limited to an industrial environment, a grid environment, a retail environment, a healthcare environment, a consumer environment, an entertainment environment, a process environment, and so forth. Depending on the environment type, edge devices 102-n and IoT Gateway device 104-n may be configured to perform specific functions specific to the environment. As shown in FIG. 1, edge device 102-2, edge device 102-4, edge device 102-6 and edge device 102-8 are connected to IoT Gateway device 104-2 and edge device 102-10, and edge device 102-12 are connected to IoT Gateway device 104-4. Examples of the edge devices 102-n include sensors, actuators, motors, valves, controllers, wearables, mobile devices, routers, switches, and remote field units. Edge devices 102-n are connected to IoT Gateway devices 104-n through one or more local area networks, wherein the local area network could be wired, wireless or a combination of both. Examples of the local area networks include, but are not limited to Bluetooth, ZigBee, Wi-Fi, Radio Frequency Identification (RFID), Infrared, Z-Wave, 6LowPAN, Thread, Near Field Communication (NFC) Sigfox, Neul, LoRaWAN, and Wibro.

IoT Gateway devices 104-n are configured to collect the data generated from edge devices 102-n and transfer the data to cloud resources in the Internet through one or more wide area networks. For example, as shown in FIG. 1, IoT Gateway devices 104-n aggregate the data generated by edge devices 102-n and transfer the data to one or more Cloud Servers 106-n through the wide area networks. As shown in FIG. 1. IoT Gateway devices 104-n are connected to Cloud Server 106-2 and Cloud Server 106-4. IoT Gateway devices 104-n also perform several other critical functions such as, but not limited to edge device connectivity, protocol translation, data filtering, data processing, security functions, software updating, and device management. Further, IoT Gateway devices 104-n also include a processor, a power source, a digital memory, physical communication ports, and a network interface. Examples of the wide area networks include, but are not limited to WLAN, Wi-Fi, WiMAX, GPS, CPRS, Ethernet, Fieldbus, Modbus, Profibus, Profinet, ControlNet, DirectNet, HART, and LTE. Thus, IoT Gateway devices 104-n acts as a bridge between edge devices 102-n and Cloud Server 106-n and facilitates communication and data exchange for performing various operations and tasks.

Figure 2:
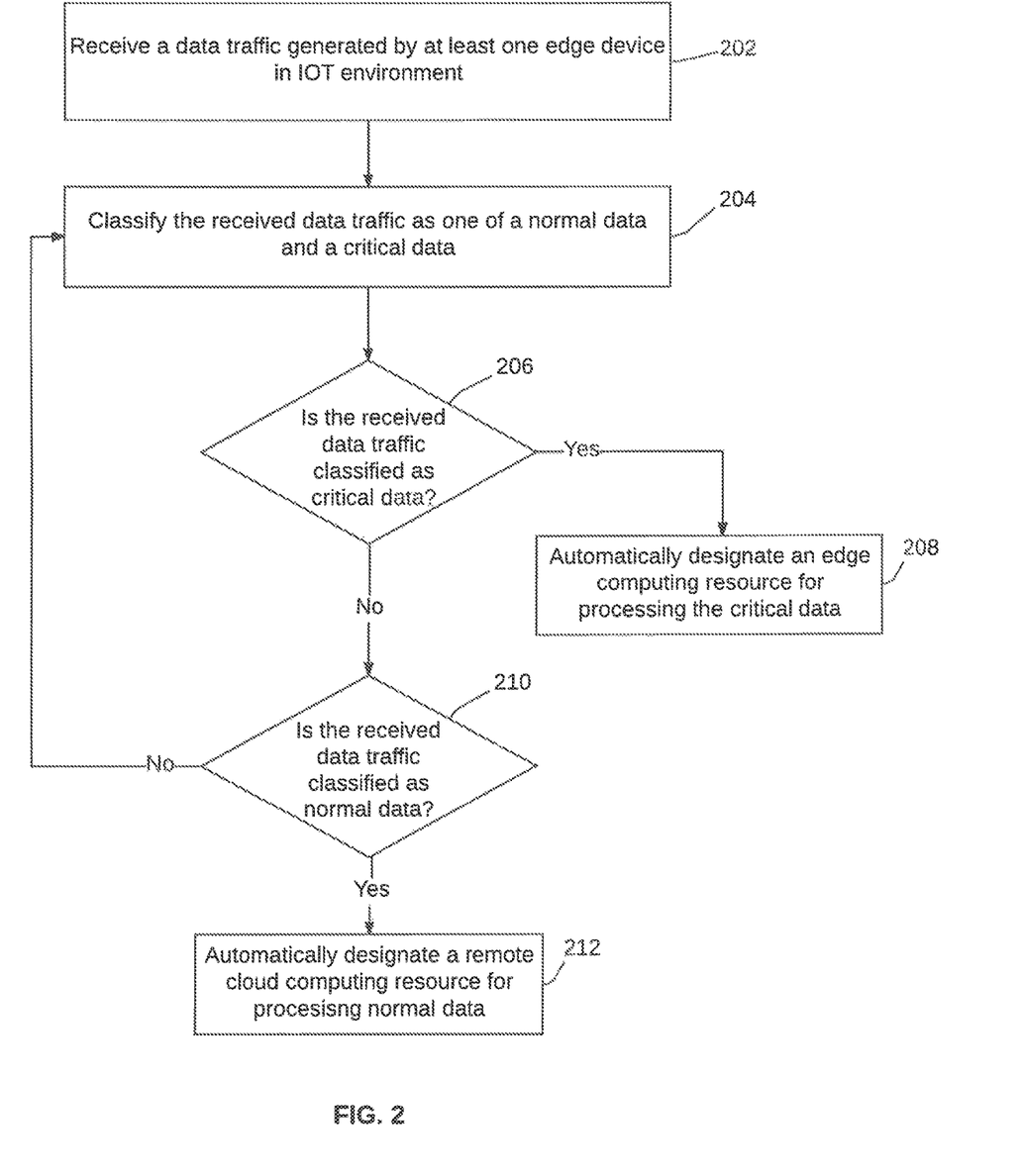
FIG. 2 illustrates a flowchart of a method for edge data processing in an IoT environment, in accordance with an embodiment.

FIG. 2 illustrates a flowchart of a method for edge data processing in IoT environment 100, in accordance with an embodiment. As explained in conjunction with FIG. 1, data generated by one or more edge devices in IoT environment 100 may be aggregated by an IoT Gateway device and thereafter the aggregated data may be transferred to a remote cloud computing resource for processing, analyzing, and handling of the aggregated data. Examples of the one or more edge devices include, but are not limited to sensors, motors, valves, actuators, generators, wearables, controllers, routers, switches, remote field units, mobile devices, consumer assets, and industrial assets. The IoT Gateway device is located at edge of IoT environment 100, such that IoT Gateway device is positioned close to one or more edge devices. Once the aggregated data is transferred to the remote cloud, one or more algorithms or instructions may be run to process, analyze, or handle the data. Analysis of the aggregated data helps in performing on or more of monitoring, maintenance, control, diagnostics, and prognostics of the one or more edge devices and various assets associated with the one or more edge devices. Consequently, analytics helps in reducing maintenance costs, avoiding equipment failures, identifying service opportunities, and improving business operations.

In order to enable edge data processing in IoT environment 100, at step 202, the IoT Gateway device receives a data traffic generated by the one or more edge devices. The data traffic is received over one or more local area networks. Examples of the one or more local area networks include, but are not limited to Bluetooth, ZigBee, Wi-Fi, Radio Frequency Identification (RFID), Infrared, Z-Wave, 6LowPAN, Thread, Near Field Communication (NFC) Sigfox, Neul, LoRaWAN, and Wibro. The data traffic from the one or more edge devices may be received by the IoT Gateway device in near real-time manner or may be received periodically at specified intervals. Depending on the type of application or the type of IoT environment 100, the data generated by the one or more edge devices is associated with certain characteristics that may define the structure, length, type, and complexity of the data. Thus, the received data traffic may correspond to a structured type of data, an unstructured type of data, a semi-structured type of data, or a combination of all. The received data traffic may also correspond to a time-series data or a time stamped data type. It will be evident to a person skilled in the art that the received data traffic may include multiple types of data, vary in size, and represent different information sources.

In response to receiving the data traffic, at step 204, the IoT Gateway device classifies the received data traffic as one of a normal data and a critical data. The classification of data as one of normal data and critical data may be performed based on a time criticalness level and a confidentiality level associated with the received data traffic. The time criticalness level and the confidentiality level of the received data traffic is computed by comparing the received data traffic with a training data present on the IoT Gateway device. In an embodiment, the training data is dynamically updated to improve the accuracy of the overall data set as well as enhance the computation of the time criticalness level and the confidential level. This is further explained in conjunction with FIG. 3.

Once the classification is performed, IoT Gateway device automatically designates a network location in IoT environment 100 for processing, analyzing and handling the received data based on the results of the classification. Thus, at step 206, it is determined whether the received data traffic is classified as critical data. If the received data traffic is classified as critical data, then at step 208, the IoT Gateway device automatically designates an edge computing resource for processing the critical data. The designated edge computing resource is positioned locally to the IoT Gateway device. In an embodiment, the edge computing resource may correspond to a container instance which is orchestrated for handling the processing of the critical data. Containers are a method of Operating System virtualization that enable an application or a processing task and their dependencies to run in a resource isolated process. Thus, a container allows the packaging of an application or a processing task's code, configuration, dependencies into easy to use building blocks that deliver environmental consistency, operational efficiency, and version control. Further, containers ensure that applications deploy quickly, reliably, and provide more granular control over resources. This is further explained in detail in conjunction with FIG. 4.

If the received data traffic does not correspond to the critical data, then at step 210, it is determined whether the received data traffic is classified as normal data. If the received data is classified as normal data, then at step 212, the IoT Gateway device automatically designates a remote cloud computing resource for handling the processing of the normal data. The remote cloud computing resource may correspond to a location in the cloud server, a virtual machine, or a processor located in the remote site. This is further explained in detail in conjunction with FIG. 5.

Figure 3:
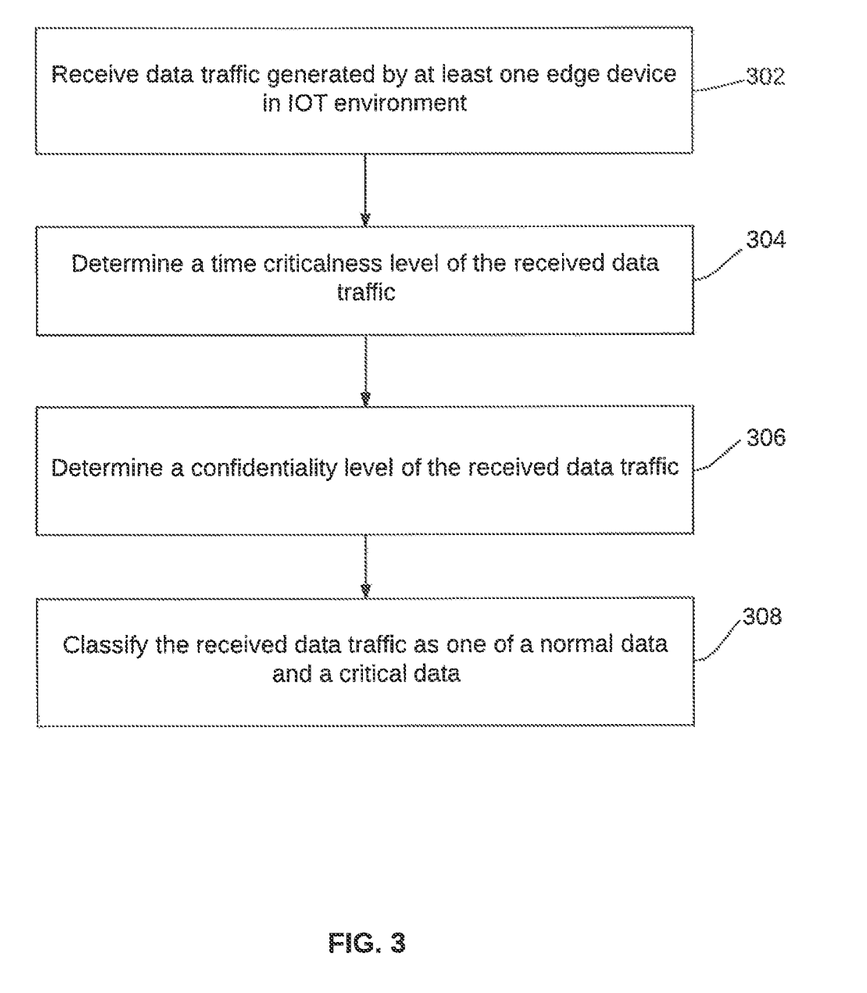
FIG. 3 illustrates a flowchart of a method for classifying the received data traffic as one of a normal data and a critical data, in accordance with an embodiment.

FIG. 3 illustrates a flowchart of a method for classifying the received data traffic as one of a normal data and a critical data, in accordance with an embodiment. Initially, at step 302, the data traffic generated by the one or more edge devices in IoT environment 100 is received by the IoT Gateway device. After receiving the data traffic, at step 304, a time criticalness level of the received data traffic is determined. The time criticalness level of the received data traffic is determined by comparing the received data traffic with a training data which is associated with time criticalness attributes. In an embodiment, the time criticalness attributes may be based on one or more of domain knowledge, application specific features, service quality attributes, and existing network resource capability. For example, the training data may include data related to application attributes such as available network resource, application type, service level performance, tenant preferences (vendor preferences), application suitability/unsuitability, deployment considerations, legal restrictions, and so forth. Further, the training data may include data related to sequenced data flow, and packet data that may be characterized with some common identifying characteristic which may be used to identify the time critical data in the incoming packets generated from the one or more edge devices.

In yet another embodiment, the training data may include characteristics of the user, historical behavior of all previous users who issued a query, words in queries observed thus far in a session, situational features related to a topic and behavioral aspects in the session, as well as temporal characteristics (at what time the query is raised). For e.g. the data from manufacturing domain related to device uptime corresponds to time critical data. In the same manner, a health-related query at a specified time, a search query, or sensor data generated by machines may correspond to time critical data. The training data may also be based on the domain specific inputs or localized inputs. In an embodiment, high volume data in retail domain related to customer specific purchases which needs to be stored and analyzed for customer purchase behavior analytics is treated as normal data traffic.

After determining the time criticalness level of the received data traffic, at step 306, a confidentiality level of the received data traffic is determined. The confidentiality level of the received data traffic is determined by comparing the received data traffic with a training data associated with confidentiality attributes. In an embodiment, the confidentiality attributes are based on one or more of application type, deployment considerations, legal restrictions, financial data protection requirements, data privacy requirements, regulatory policies and so forth. The training data may include data related to sequenced data flow, and packet data that may be characterized with some common identifying characteristic which may be used to identify the confidentiality level of the incoming packets in the data generated from the one or more edge devices. For example, the health care domain data coming from the devices is related to individual personal health records and as per regulatory requirements, it should not be transmitted outside an enterprise network and may therefore be considered as critical data.

Once the time criticalness level and the confidentiality level of the received data traffic is determined, at step 308, the IoT Gateway device classifies the received data traffic as one of normal data traffic and critical data traffic by comparing the training data with the incoming packets and applying the knowledge gained by computing the time criticalness level and the confidentiality level. The classification may be performed either in a batch manner by storing the received data traffic at the IoT Gateway device or in a near real time manner by performing the classification as and when the data is received from the one or more edge devices.

In an embodiment, one or more of a machine learning algorithm, and an artificial intelligence algorithm may be employed for computing the time criticalness level and the confidentiality level which are used to classify the received data traffic as normal data or critical data. The machine learning algorithms and the artificial intelligence algorithms may correspond to a supervised learning algorithm, a semi-supervised learning algorithm, or an unsupervised learning algorithm. Examples of the machine learning algorithm that may be employed to perform the classification include, but are not limited to regression analysis, logistic regression, linear regression, multivariate regression, back propagation neural network, Artificial Neural Network, apriori algorithm, K-means algorithm, K-nearest neighbor, Learning vector quantization, Self-organizing map, decision trees algorithm, Bayesian algorithm, clustering algorithm, deep learning algorithm, and ensemble algorithm. The machine learning and artificial intelligence algorithm execute on a set of data to populate the training data.

Figure 4:
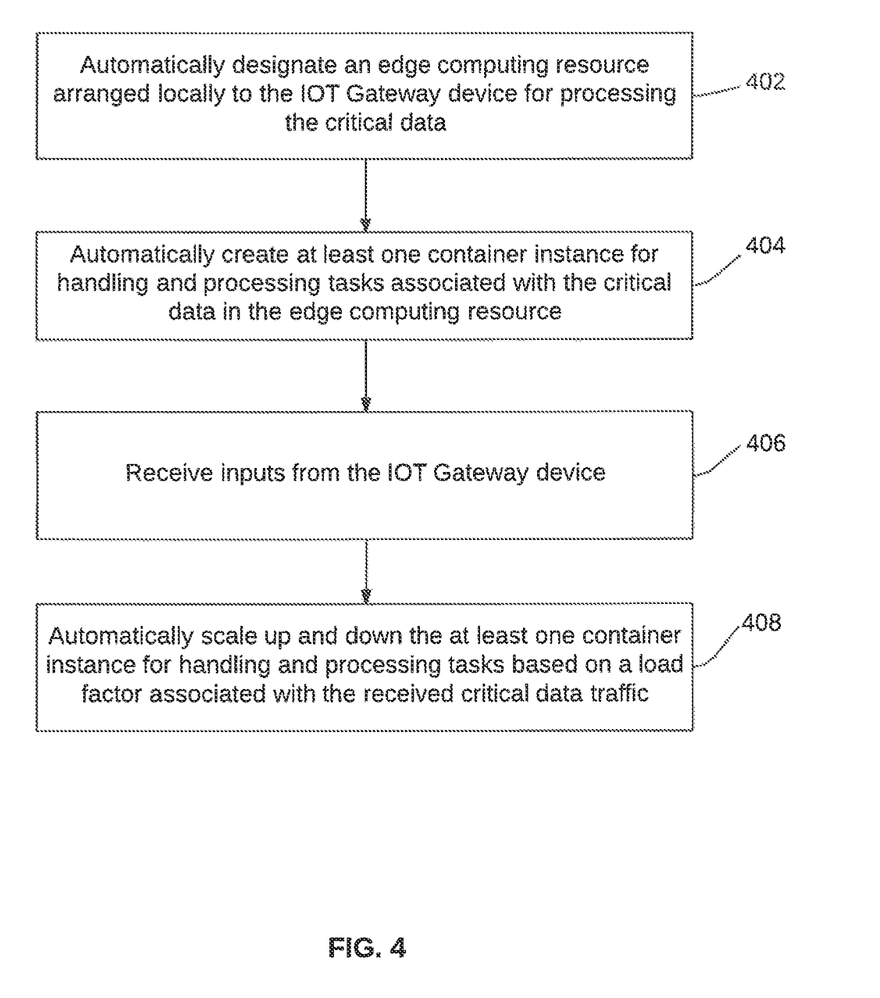
FIG. 4 illustrates a flowchart of a method for automatically designating an edge computing resource for handling the processing tasks associated with critical data, in accordance with an embodiment.

FIG. 4 illustrates a flowchart of a method for automatically designating an edge computing resource for handling the processing tasks associated with critical data, in accordance with an embodiment. Once the received data traffic is classified as critical data and normal data based on or more of the time criticalness level and the confidentiality level associated with the received data traffic, the IoT Gateway device automatically designates a network location for processing, analyzing, and handling the critical data traffic and the normal data traffic. Thus, at step 402, the IoT Gateway device automatically designates an edge computing resource for processing, analyzing, and handling the "critical data" part of the received data traffic. As has already been explained in FIG. 2, the edge computing resource is positioned locally to the IoT Gateway device at the edge level in IoT environment 100. Once the IoT Gateway device designates the edge computing resource as the network location for processing, analyzing, and handling the critical data, at step 404, the IoT Gateway device automatically creates one or more container instances for processing, analyzing, and handling the critical data by using a Container Orchestrator. In an embodiment, the one or more containers are instantiated using platform specific images pre-stored in registries using orchestrators such as Docker Swarm.

Thereafter, at step 406, the Container Orchestrator receives input from the IoT Gateway device about the received data traffic. The inputs may correspond to amount of critical data and normal data present in the received data traffic at the IoT Gateway device. The inputs may also correspond to one or more of volume, velocity, variety associated with the critical data and normal data present in the received data traffic. A load factor may be computed based on the inputs received for the critical data and normal data from the IoT Gateway device. The load factor indicates an amount of edge computing resource that may be required to efficiently handle and process the critical data. Consequently, based on the inputs received about the critical data, at step 408, the one or more container instances are automatically scaled up or down by the Container Orchestrator. The range of scaling up or down the one or more container instance are determined based on the load factor that is computed for the critical data.

Figure 5:
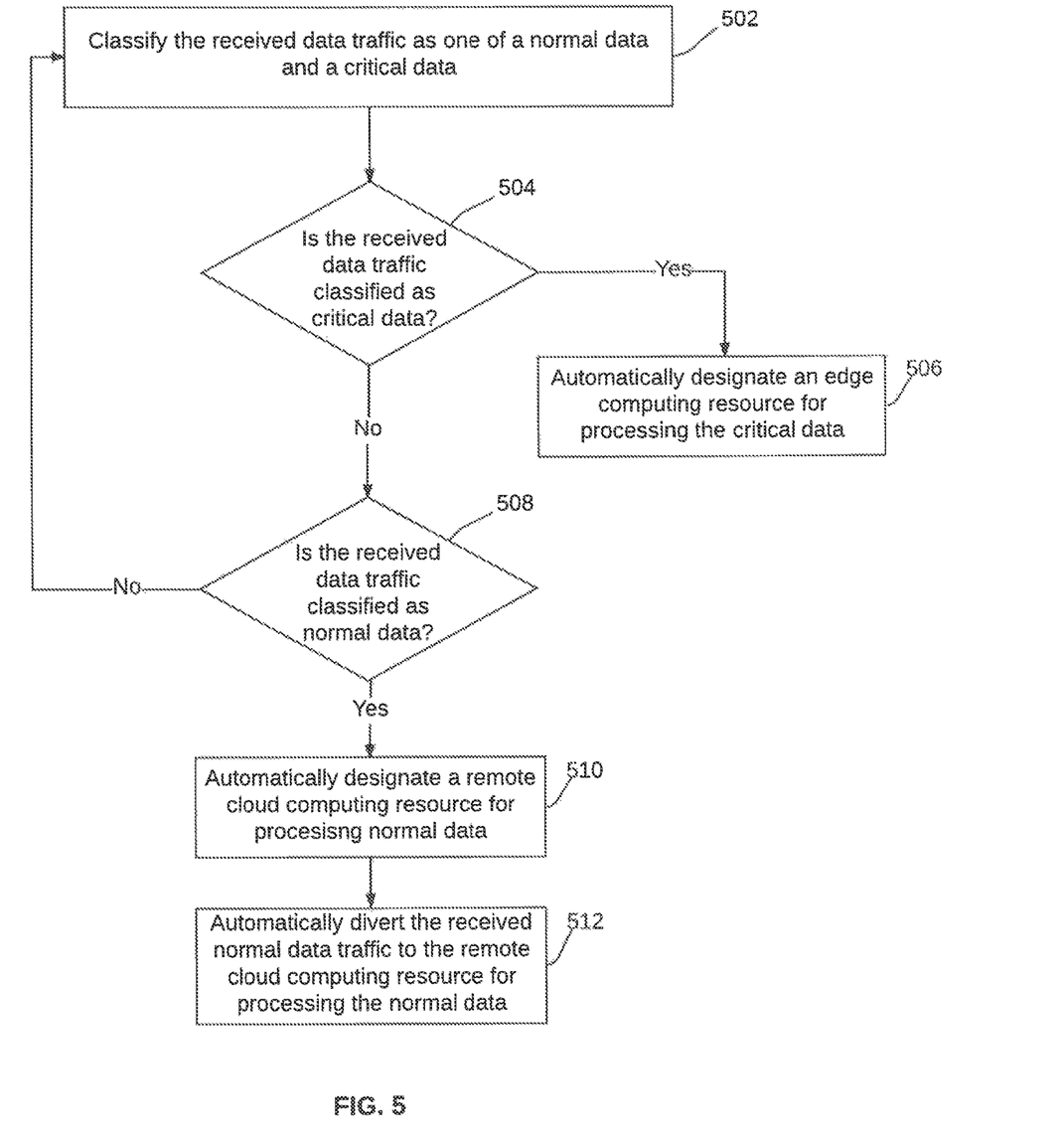
FIG. 5 illustrates a flowchart of a method for automatically designating a remote cloud computing resource for processing, analyzing, and handling tasks associated with normal data, in accordance with an embodiment.

FIG. 5 illustrates a flowchart of a method for automatically designating a remote cloud computing resource for processing, analyzing, and handling tasks associated with normal data, in accordance with an embodiment. Initially, at step 502, the received data traffic is classified as normal data and critical data based on the time criticalness level and confidentiality level of the received data traffic. This has already been explained in conjunction with FIG. 3. After classifying the received data traffic, at step 504, it is determined whether the received data is classified as critical data. If the data is classified as critical data, then at step 506, the IoT Gateway device automatically designates an edge computing resource for processing, analyzing, and handling the critical data. This has already been explained in conjunction with FIG. 4.

If the data is not classified as critical data, then at step 508, it is determined whether the received data is classified at normal data. If the data is classified as normal data, then at step 510, the IoT Gateway device automatically designates a remote cloud computing resource for processing, analyzing, and handling the tasks associated with the normal data. Once the remote cloud computing resource has been designated, at step 512, the IoT Gateway device thereafter automatically diverts the normal data part of the received data traffic to the designated remote cloud computing resource.

The remote cloud computing resource may be instantiated in one or more of a web server, a cloud server, an enterprise server, or a public server. As a result, the "normal data" part of the received data traffic is not processed or stored at the edge computing resource and is rather diverted to the remote cloud computing resource.

Figure 6:
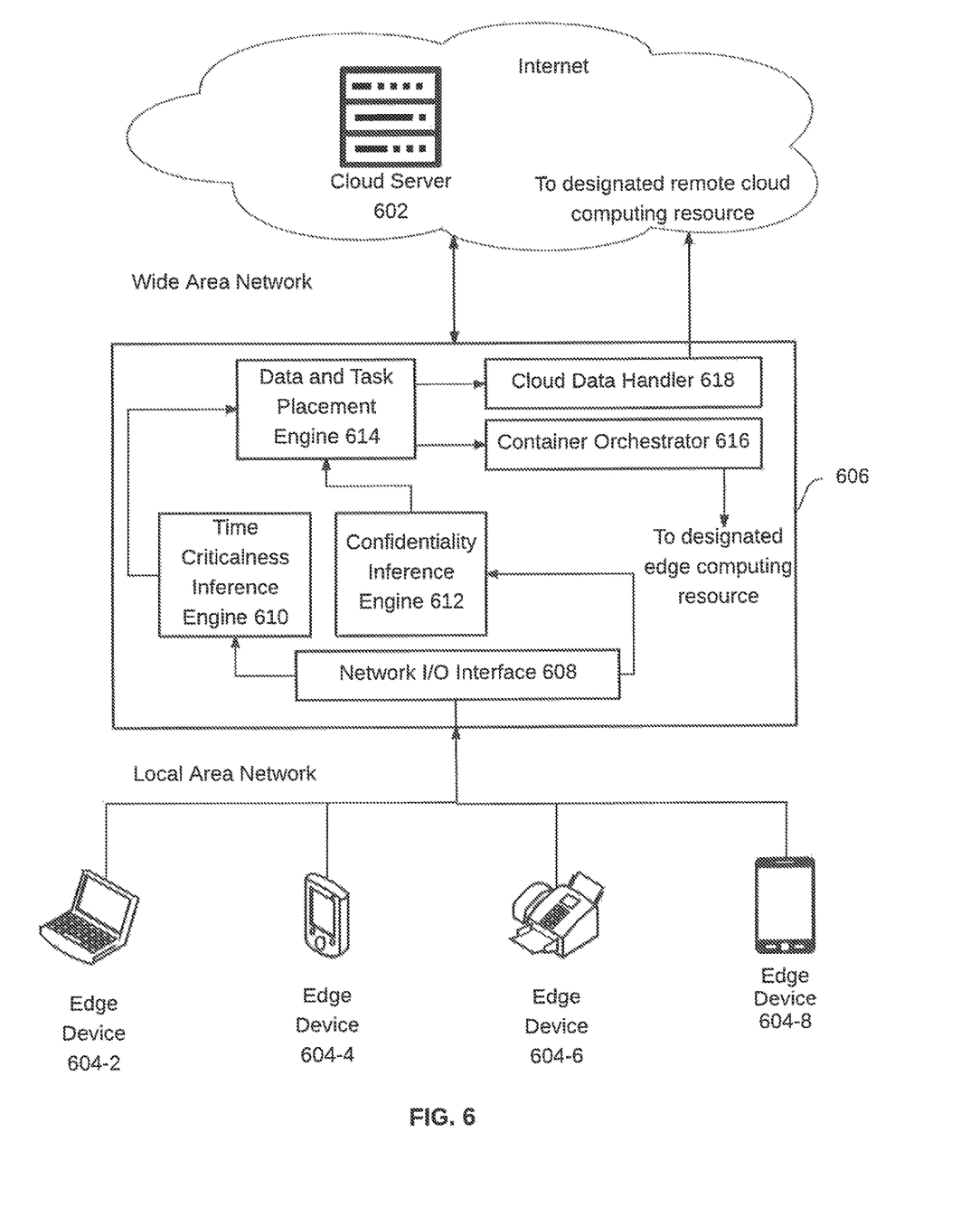
FIG. 6 illustrates a system for edge data processing in an IoT environment, in accordance with an embodiment.

FIG. 6 illustrates a system 600 for edge data processing in IoT environment 100, in accordance with an embodiment. System 600 includes a cloud server 602, one or more edge devices 604-*n*, and an IoT Gateway device 606. IoT Gateway device 606 is operatively coupled with one or more edge devices 604-*n* and cloud server 602. As shown in FIG. 6, edge device 604-2, edge device 604-4, edge device 604-6, and edge device 604-8 are operatively connected to IoT Gateway device 606. Examples of one or more edge devices 604-*n* include, but are not limited to a sensor, an actuator, a motor, a generator, a wearable device, an electrical device, an industrial asset, a mobile device, and a consumer device.

IoT Gateway device 606 is located at the edge level in IoT environment 100. IoT Gateway device further includes a Network I/O Interface 608, a Time Criticalness Inference Engine 610, a Confidentiality Inference Engine 612, a Data and Task Placement Engine 614, a Container Orchestrator 616, and a Cloud Data Handler 614. Each edge device is configured to generate data about itself or about an asset associated with the edge device. IoT Gateway device 606 is configured to aggregate the data generated by one or more edge devices 604-*n* in IoT environment 100. IoT Gateway device 606 is also configured to transfer the aggregated data to remote cloud server 602 for processing, analyzing, and handling the aggregated data. Analysis of the aggregated data helps in performing on or more of monitoring, maintenance, control, diagnostics, and prognostics of the one or more edge devices and various assets associated with the one or more edge devices. This has already been explained in detail in conjunction with FIG. 2.

To process, analyze and handle the aggregated data, IoT Gateway device 606 is configured to receive a data traffic generated by one or more edge devices 604-*n* in IoT environment 100. The data traffic is received by Network I/O Interface 608 located in IoT Gateway device 606 over one or more local area networks. Examples of the one or more local area networks include, but are not limited a ZigBee, RFID, Wi-Fi, and Bluetooth. The data traffic may be received by IoT Gateway device 606 in a near real-time manner or in a periodic manner. Depending on the type of application or the type of IoT environment 100, the data generated by one or more edge devices 604-*n* is associated with certain characteristics that may define the structure, length, type, and complexity of the data. Thus, the received data traffic may include a structured type of data, an unstructured type of data, a semi-structured type of data, or a combination of all. The received data traffic may also represent a time-series data or a time stamped data type. It will be evident to a person skilled in the art that the received data traffic may include multiple types of data that may vary in size, and represent different information sources. After receiving the data traffic, IoT Gateway device 606 classifies the received data traffic as one of a normal data and a critical data. The classification of data as one of normal data and critical data may be performed based on a time criticalness level and a confidentiality level associated with the received data traffic.

Time Criticalness Inference Engine 610 present in IoT Gateway device 606 is configured to determine the time criticalness level. The time criticalness level of the received data traffic is determined by comparing the received data traffic with a training data associated with time criticalness attributes. In an embodiment, the time criticalness attributes may be based on one or more of domain knowledge, application specific features, service quality attributes, and existing network resource capability. For example, the training data may include data related to application attributes such as available network resource, application type, service level performance, tenant preferences (vendor preferences), application suitability/unsuitability, deployment considerations, legal restrictions, and so forth. The training data may include data related to sequenced data flow, and packet data that may be characterized with some common identifying characteristic that is used to identify the time critical data from the incoming packets in the data traffic generated from the one or more edge devices. This has already been explained in conjunction with FIG. 3.

After determining the time criticalness level, Confidentiality inference Engine 612 present in IoT Gateway device 606 is employed to determine the confidentiality level of the received data traffic. The confidentiality level of the received data traffic is determined by comparing the received data traffic with a training data associated with confidentiality attributes. In an embodiment, the confidentiality attributes are based on one or more of application type, deployment considerations, legal restrictions, financial data protection requirements, data privacy requirements, regulatory policies and so forth. The training data may include data related to sequenced data flow, and packet data that may be characterized with some common identifying characteristic that is used to identify the confidentiality level of the incoming packets in the data traffic generated from the one or more edge devices. This has already been explained in detail in conjunction with FIG. 3.

Once the time criticalness level and the confidentiality level of the received data traffic is determined, IoT Gateway device 606 classifies the received data traffic as one of normal data traffic and critical data traffic. The classification may be performed in a batch manner by storing the received data traffic at IoT Gateway device 606 in a local storage or in a near real time manner by performing the classification as and when the data is received from one or more edge devices 604-n. Once the classification is performed, IoT Gateway device 606 determines whether the received data traffic is classified as critical data.

If the received data traffic is classified as critical data, then Data and Task Placement Engine 614 present in IoT Gateway device 606 automatically designates a network location for processing, analyzing and handling the received data traffic. When the received data traffic is critical data, then Data and Task Placement Engine 614 automatically designates an edge computing resource for processing the critical data. The designated edge computing resource is positioned locally to IoT Gateway device 606. In an embodiment, the edge computing resource may correspond to a container instance which is orchestrated for handling the processing of the critical data by Container Orchestrator 616 present in IoT Gateway device 606. Thus, one or more container instances may be instantiated by IoT Gateway device 606 for processing, analyzing, and handling the critical data by employing Container orchestrator 616. The number of container instances to be instantiated is determined based on inputs received by container orchestrator 616 from other components of IoT Gateway device 606 such as inputs from Time Criticalness Inference Engine 610, Confidentiality Inference Engine 612 and Network I/O Interface 608. The inputs may correspond to amount of critical data and normal data present in the received data traffic at IoT Gateway device 606. The inputs may also correspond to one or more of volume, velocity, variety associated with the critical data and normal data present in the received data traffic at Network I/O Interface 608.

A load factor may be computed by Data and Task Placement Engine 614 based on the inputs received for the critical data and normal data. The load factor indicates an amount of edge computing resource that may be required to efficiently handle and process the critical data. Therefore, based on the inputs received and the computed load factor, Container Orchestrator 616 automatically scales the one or more container instances up or down for handling and processing the critical data. This has already been explained in detail in conjunction with FIG. 4.

When the received data is classified as normal data, then Data and Task Placement Engine 614 automatically designates a remote cloud computing resource in cloud server 602 for processing and handling of the normal data. Once the remote cloud computing resource has been designated, Cloud Data Handler 618 present in IoT Gateway device 606 automatically diverts the normal data part of the received data traffic to the designated remote cloud computing resource in cloud server 602.

Figure 7:
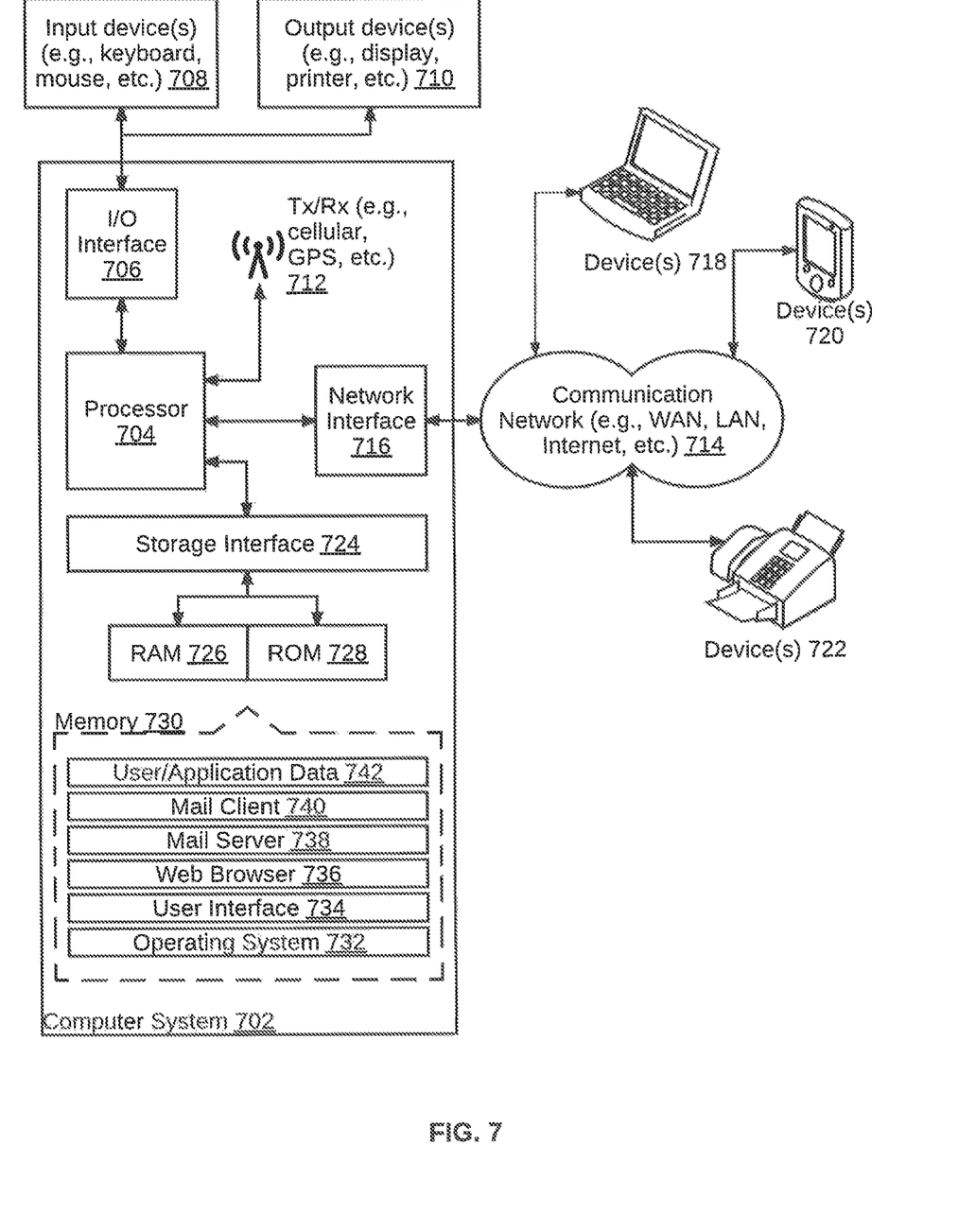
FIG. 7 illustrates a block diagram of an exemplary computer system for implementing various embodiments.

Referring now to FIG. 7, a block diagram of an exemplary computer system for implementing various embodiments is illustrated. Computer system 702 may include a central processing unit ("CPU" or "processor") 704. Processor 704 may include at least one data processor for executing program components for executing user-generated requests or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 716, 720, and 722. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of the devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent disks (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® OS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MCROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRPT® programming language, PERL® programming language, PHP® programming language, PYTHON® programming language, WebObjects, etc. Mail server 738 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods, system, and computer program products for data processing in an IoT environment. The classification of received data traffic as normal data and critical data facilitates in selecting a network location for processing, analyzing and handling the received data traffic based on the classification. The method facilitates processing of the critical data at the edge level in the IoT environment thereby ensuring security associated with the critical data is not compromised. Further, by processing the critical data at the edge level, the method ensures that the latency is minimized and the response time is faster and efficient. The method uses the advantages provided by machine learning and artificial intelligence algorithms to continuously train the data thereby increasing the accuracy of the data classification. The method also automates the designation of network location for processing, analyzing and handling of the received data traffic by employing container technology at the edge level. Moreover, the container orchestration ensures that the edge computing resources automatically scale up or down based on the inputs received by the IoT Gateway device thereby making the entire operation seamless and efficient.

The specification has described systems and methods for data processing in an IoT environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for edge data processing in an Internet of Things (IoT) environment, the method comprising:
    receiving, by an IoT Gateway device, a data traffic generated by at least one edge device in the IoT environment;
    classifying, by the IoT Gateway device, the received data traffic as one of a normal data and a critical data based on time criticalness level and confidentiality level of the received data traffic, wherein one or more of a machine learning algorithm and an artificial intelligence algorithm is employed for computing the time criticalness level and the confidentiality level,
        wherein the confidentiality level of the received data traffic is determined by comparing the received data traffic with a training data associated with confidentiality attributes,
        wherein the training data comprises data related to a sequenced data flow, and a packet data characterized with some common identifying characteristic used to identify the confidentiality level of the received data traffic,
        wherein the confidentiality attributes are based on one or more of application type, deployment considerations, legal restrictions, financial data protection requirements, data privacy requirements and regulatory policies;
    automatically creating, by the IoT Gateway device, at least one container instance for handling processing tasks associated with the critical data in an edge computing resource arranged locally to the IoT Gateway device,
        wherein the at least one container instance is created based on inputs associated with one or more volume, velocity, variety associated with the critical data and the normal data present in the received data traffic;
    automatically scaling up and down, by the IoT Gateway device, the at least one container instance for handling the processing tasks based on a load factor associated with the received critical data traffic; and
    automatically designating, by the IoT Gateway device, a network location for processing the received data traffic in response to classifying, wherein the network location corresponds to the edge computing resource arranged locally to the IoT Gateway device when the received data is classified as critical data and the network location corresponds to a remote cloud computing, resource when the received data is classified as normal data.

2. The method of claim 1, wherein the time criticalness level is determined by comparing the received data traffic with a training data associated with time criticalness attributes.

3. The method of claim 2, wherein the time criticalness attributes are determined based on at least one of domain knowledge, application specific features, service quality attributes, existing network resource capabilities, temporal characteristics, tenant preferences, deployment considerations, user characteristics, and historical attributes.

4. The method of claim 1, further comprising automatically diverting the received normal data traffic to the remote cloud computing resource for handling the processing tasks associated with the normal data.

5. A system for edge data processing in an Internet of Things (IoT) environment, the system comprising:
a cloud server;
at least one edge device; and
an IoT Gateway device, wherein the IoT Gateway device is operatively coupled with the at least one edge device and the cloud server, the IoT Gateway device configured to:
receive a data traffic generated by at least one edge device in the IoT environment;
classify the received data traffic as one of a normal data and a critical data based on time criticalness level and confidentiality level of the received data traffic, wherein one or more of a machine learning algorithm and an artificial intelligence algorithm is employed for computing the time criticalness level and the confidentiality level,
wherein the confidentiality level of the received data traffic is determined by comparing the received data traffic with a training data associated with confidentiality attributes,
wherein the training data comprises data related to a sequenced data flow, and a packet data characterized with some common identifying characteristic used to identify the confidentiality level of the received data traffic,
wherein the confidentiality attributes are based on one or more of application type, deployment considerations, legal restrictions, financial data protection requirements, data privacy requirements and regulatory policies;
automatically creating, by the IoT Gateway device, at least one container instance for handling processing tasks associated with the critical data in an edge computing resource arranged locally to the IoT Gateway device;
wherein the at least one container instance is created based on inputs associated with one or more volume, velocity, variety associated with the critical data and the normal data present in the received data traffic;
automatically scaling up and down, by the IoT Gateway device, the at least one container instance for handling the processing tasks based on a load factor associated with the received critical data traffic; and
automatically designate a network location for processing the received data traffic in response to classifying, wherein the network location corresponds to the edge computing resource arranged locally to the IoT Gateway device when the received data is classified as critical data and the network location corresponds to a remote cloud computing resource when the received data is classified as normal data.

6. The system of claim 5, wherein the time criticalness level is determined by comparing the received data traffic with a training data associated with time criticalness attributes.

7. The system of claim 6, wherein the IoT Gateway device is further configured to determine the time criticalness attributes based on at least one of a domain knowledge, application specific features, service quality attributes, existing network resource capabilities, temporal characteristics, user characteristics, and historical attributes.

8. The system of claim 5, wherein the IoT Gateway device is further configured to employ a container orchestrator arranged locally to the IoT Gateway device for creating the at least one container instance using platform specific images pre-stored in registries.

9. The system of claim 8, wherein the IoT Gateway device is further configured to automatically scale up and down the at least one container instance for handling processing tasks based on a load factor associated with the received critical data traffic.

10. The system of claim 5, wherein the IoT Gateway device is further configured to automatically divert the received normal data traffic to the remote cloud computing resource for handling the processing tasks associated with the normal data.

11. A computer readable medium having non-transitory computer readable instructions stored thereon for execution by a processor in an IoT Gateway device to perform a method for:
receiving a data traffic generated by at least one edge device in the IoT environment;
classifying the received data traffic as one of a normal data and a critical data based on time criticalness level and confidentiality level of the received data traffic, wherein one or more of a machine learning algorithm and an artificial intelligence algorithm is employed for computing the time criticalness level and the confidentiality level,
wherein the confidentiality level of the received data traffic is determined by comparing the received data traffic with a training data associated with confidentiality attributes,
wherein the training data comprises data related to a sequenced data flow), and a packet data characterized with some common identifying characteristic used to identify the confidentiality level of the received data traffic,
wherein the confidentiality attributes are based on one or more of application type, deployment considerations, legal restrictions, financial data protection requirements, data privacy requirements and regulatory policies;
automatically creating, by the IoT Gateway device, at least one container instance for handling processing tasks associated with the critical data in an edge computing resource arranged locally to the IoT Gateway device;
wherein the at least one container instance is created based on inputs associated with one or more volume, velocity, variety associated with the critical data and the normal data present in the received data traffic;
automatically scaling up and down, by the IoT Gateway device, the at least one container instance for handling the processing tasks based on a load factor associated with the received critical data traffic; and
automatically designating a network location for processing the received data traffic in response to classifying, wherein the network location corresponds to the edge computing resource arranged locally to the IoT Gateway device when the received data is classified as critical data and the network location corresponds to a remote cloud computing resource when the received data is classified as normal data.

* * * * *